US012578973B2

(12) United States Patent
Agarwal et al.

(10) Patent No.: US 12,578,973 B2
(45) Date of Patent: Mar. 17, 2026

(54) SYSTEMS AND METHODS FOR REDUCING BOOT TIME IN A COMPUTER SYSTEM

(71) Applicant: QUALCOMM INCORPORATED, San Diego, CA (US)

(72) Inventors: Vishal Agarwal, Bangalore (IN); Govindh B, Aluva (IN)

(73) Assignee: Qualcomm Incorporated, San Diego, CA (US)

( * ) Notice: Subject to any disclaimer, the term of this patent is extended or adjusted under 35 U.S.C. 154(b) by 239 days.

(21) Appl. No.: 18/487,894

(22) Filed: Oct. 16, 2023

(65) Prior Publication Data

US 2025/0123851 A1 Apr. 17, 2025

(51) Int. Cl.
*G06F 9/4401* (2018.01)

(52) U.S. Cl.
CPC ................................. *G06F 9/4416* (2013.01)

(58) Field of Classification Search
None
See application file for complete search history.

(56) References Cited

U.S. PATENT DOCUMENTS

| | | | | |
|---|---|---|---|---|
| 8,589,667 B2 * | 11/2013 | Mujtaba | ................. | G06F 21/78 |
| | | | | 713/168 |
| 8,874,097 B1 * | 10/2014 | Warsaw | ................ | H04W 88/06 |
| | | | | 455/418 |
| 2012/0099630 A1 * | 4/2012 | Verhelst | ................ | H04B 17/16 |
| | | | | 455/67.11 |
| 2013/0217348 A1 * | 8/2013 | Hu | ........................ | H04M 1/24 |
| | | | | 455/90.2 |

* cited by examiner

*Primary Examiner* — Fahmida Rahman
(74) *Attorney, Agent, or Firm* — Smith Tempel Blaha LLC

(57) ABSTRACT

Systems and methods for reducing boot time in a computer system divide the boot instructions into a start-up boot instruction segment and a mission-mode boot instruction segment. The start-up boot instruction segment is downloaded from persistent memory of the computer system to a random access memory (RAM) of the computer system and executed prior to a radio frequency (RF) analog (RFA) module of the computer system perform an RF calibration process that calibrates the RFA module to perform a wireless communication protocol. During the RF calibration process, the mission-mode boot instruction segment is downloaded from persistent memory to RAM and executed. Downloading the mission-mode boot instruction segment during the RF calibration process greatly reduces the overall amount of time required to boot the computer system.

14 Claims, 5 Drawing Sheets

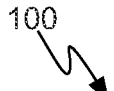
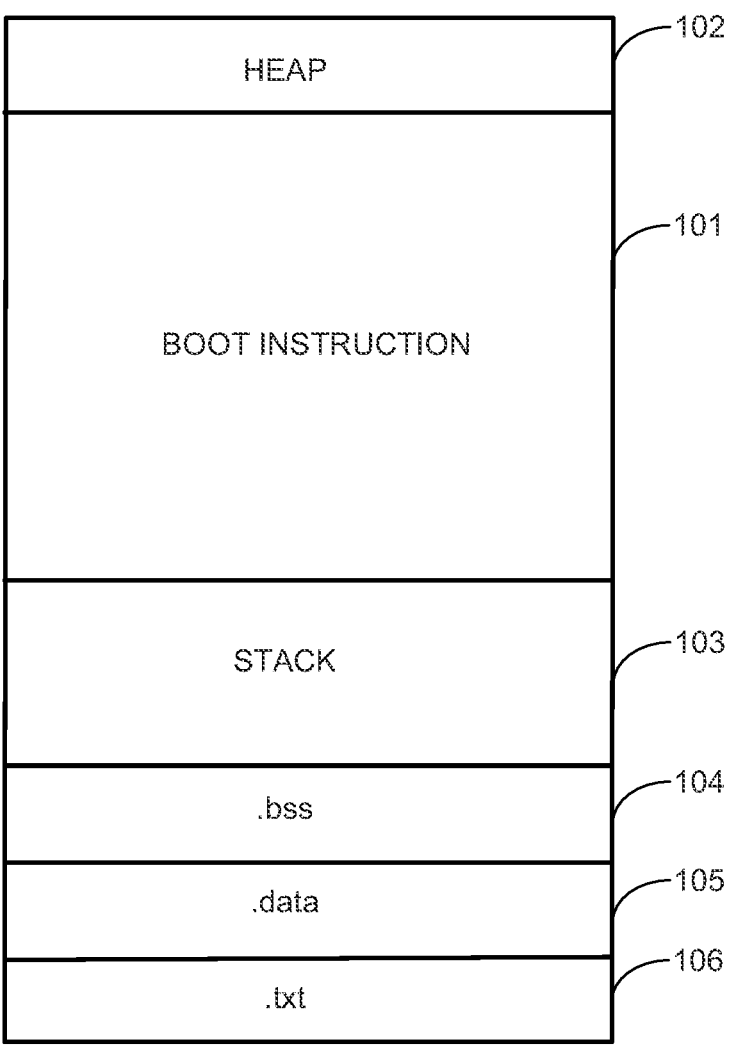
FIG. 1

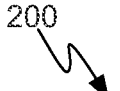
200
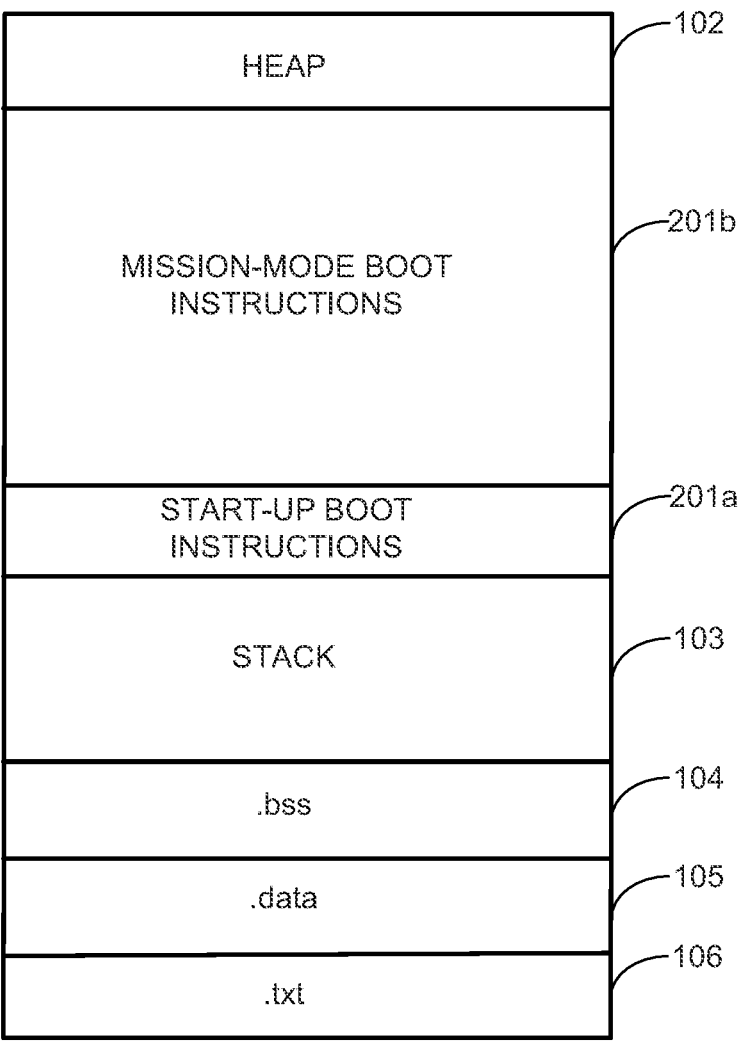
| | |
|---|---|
| HEAP | 102 |
| MISSION-MODE BOOT INSTRUCTIONS | 201b |
| START-UP BOOT INSTRUCTIONS | 201a |
| STACK | 103 |
| .bss | 104 |
| .data | 105 |
| .txt | 106 |
FIG. 2

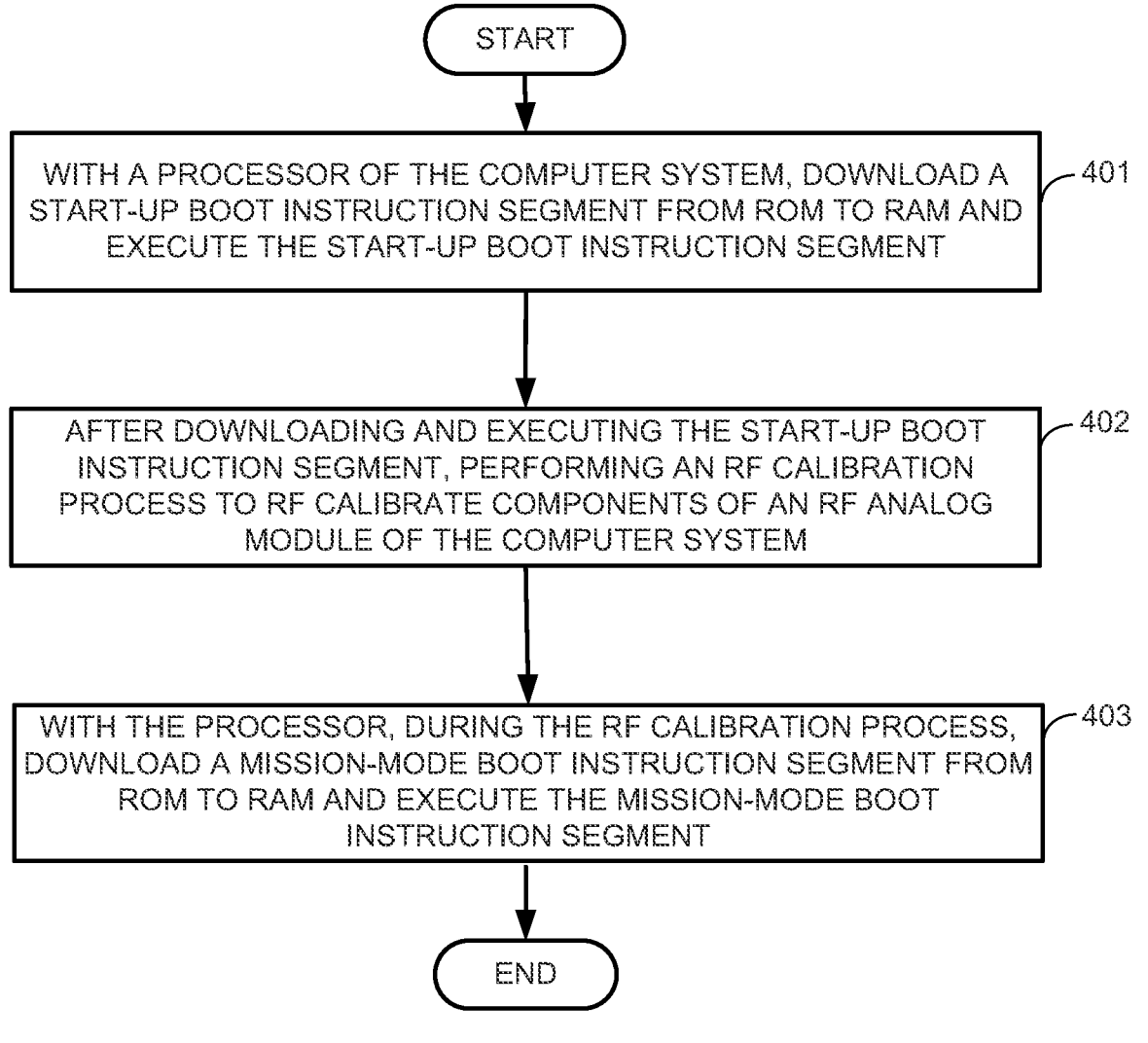

START

WITH A PROCESSOR OF THE COMPUTER SYSTEM, DOWNLOAD A START-UP BOOT INSTRUCTION SEGMENT FROM ROM TO RAM AND EXECUTE THE START-UP BOOT INSTRUCTION SEGMENT — 401

AFTER DOWNLOADING AND EXECUTING THE START-UP BOOT INSTRUCTION SEGMENT, PERFORMING AN RF CALIBRATION PROCESS TO RF CALIBRATE COMPONENTS OF AN RF ANALOG MODULE OF THE COMPUTER SYSTEM — 402

WITH THE PROCESSOR, DURING THE RF CALIBRATION PROCESS, DOWNLOAD A MISSION-MODE BOOT INSTRUCTION SEGMENT FROM ROM TO RAM AND EXECUTE THE MISSION-MODE BOOT INSTRUCTION SEGMENT — 403

END

FIG. 4

SYSTEMS AND METHODS FOR REDUCING BOOT TIME IN A COMPUTER SYSTEM

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications. A computing device may also be a stationary computer, such as a personal computer (PC) or various types of desktop computers or workstation computers.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc. Computing devices also include various types of memory devices, such as various types of random access memory (RAM), persistent memory (e.g., read only memory (ROM)) and flash memory devices that are used by the processing units for storing data and computer instructions.

Many PCDs are capable of being used with wireless communications devices, such as, for example, headset systems and earbud systems that allow users to consume music, voice (e.g., audio books) and other types of content via wireless communication connections (e.g., Bluetooth connections) between the headset or earbud systems and the PCDs. PCDs can also be configured as headset or earbud systems. Users find it highly desirable to reduce headset or earbud system boot time and generally want it to be less than about one second. For that reason, competitors in the PCD industry are constantly working to reduce headset and earbud system boot time. Earbud systems are usually kept powered off in charging cases to save power. Users generally want earbud systems to be able to connect to the PCD (e.g., the phone) as quickly as possible when taken out of the earbud charging case. To meet this demand, the earbuds should boot up and establish a link with the PCD by the time the earbud reaches the user's ear.

Accordingly, a need exists for a way to reduce boot time in computer systems such as those used in music, voice, text and other content delivery devices.

SUMMARY OF THE DISCLOSURE

Systems, methods, and other examples are disclosed for reducing boot time in a computer system.

An exemplary embodiment of the method comprises:

with a processor of the computer system, downloading a start-up boot instruction segment from a persistent memory of the computer system to RAM of the computer system and executing the start-up boot instruction segment;

with a radio frequency (RF) analog (RFA) module of the computer system configured to perform a wireless communication protocol, after downloading and executing the start-up boot instruction segment, performing an RF calibration process that RF calibrates components of the RFA module; and with the processor, during the RF calibration process, downloading a mission-mode boot instruction segment from the persistent memory to the RAM and executing the mission-mode boot instruction segment.

An exemplary embodiment of the computer system comprises an RFA module and first and second processing logic. The RFA module of the computer system is configured to perform an RF calibration process that RF calibrates the RFA module to perform a wireless communication protocol. The first processing logic is configured to cause a start-up boot instruction segment to be downloaded from a persistent memory of the computer system to RAM of the computer system and to be executed prior to the RFA module performing the RF calibration process. The second processing logic is configured to cause a mission-mode boot instruction segment to be downloaded from the persistent memory to the RAM and executed during the RF calibration process.

An exemplary embodiment of a computer program comprises computer instructions for execution by a host processor of a computer system for reducing boot time of the computer system. The computer program is embodied on a non-transitory computer-readable medium and comprises a start-up boot instruction segment and a mission-mode computer instruction segment. The start-up boot instruction segment is stored in RAM for execution by the host processor prior to an RFA module of the computer system performing an RF calibration process that RF calibrates the RFA module to perform a wireless communication protocol. The mission-mode boot instruction segment is stored in the RAM for execution by the host processor during the RF calibration process.

Another exemplary embodiment of the computer system comprises:

means for downloading a start-up boot instruction segment from a persistent memory to RAM and for executing the start-up boot instruction segment prior to an RF calibration process being performed that calibrates an RFA module of the computer system to perform a wireless communication protocol; and means for downloading a mission-mode boot instruction segment from the persistent memory to the RAM and for executing the mission-mode boot instruction segment during the RF calibration process.

These and other features and advantages will become apparent from the following description, drawings and claims.

BRIEF DESCRIPTION OF THE DRAWINGS

In the Figures, like reference numerals refer to like parts throughout the various views unless otherwise indicated.

FIG. 1 illustrates a block diagram of a Bluetooth subsystem (BTSS) RAM currently used in wire-free music and voice delivery devices such as earbuds, hearables and headsets.

FIG. 2 illustrates a block diagram of a BTSS RAM in accordance with a representative embodiment in which the boot instruction segment shown in FIG. 1 has been replaced with a start-up boot instruction segment and a mission-mode boot instruction segment.

FIG. 4 illustrates a flow diagram that represents the method for reducing boot time in a computer system in accordance with a representative embodiment.

DETAILED DESCRIPTION

Figure 3:
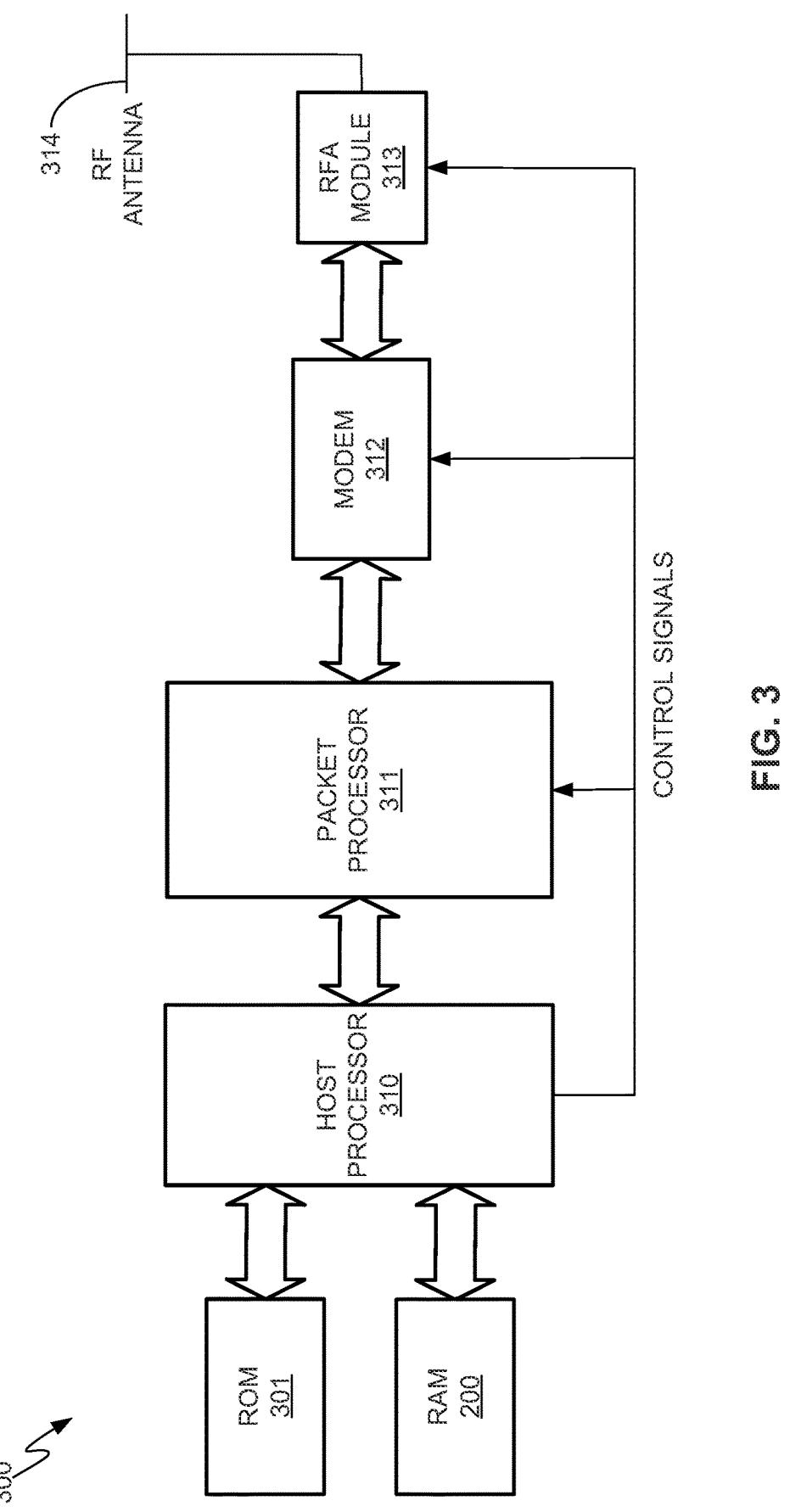
FIG. 3 illustrates a block diagram of the computer system in accordance with a representative embodiment that includes the RAM shown in FIG. 2 configured to include the start-up and mission-mode boot instructions shown in FIG. 2.

The present disclosure discloses systems, methods and other embodiments for reducing boot time in a computer system. The boot instructions are divided into a start-up boot instruction segment and a mission-mode boot instruction segment. The start-up boot instruction segment is downloaded from persistent memory of the computer system to RAM of the computer system and executed prior to a radio frequency (RF) analog (RFA) module of the computer system performing an RF calibration process that calibrates the RFA module to perform a wireless communication protocol. During the RF calibration process, the mission-mode boot instruction segment is downloaded from persistent memory to RAM and executed. Downloading and executing the mission-mode boot instruction segment during the RF calibration process greatly reduces the overall amount of time required to boot the computer system. Representative embodiments in accordance with the inventive principles and concepts of the present disclosure are described below with reference to the figures.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein, encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

The term "logic," as that term is used herein, denotes digital circuits, such as digital gate structures, that are combined and configured in a particular manner to achieve one or more particular functions. For example, control logic can be a combination of digital circuits that have been combined and configured in a particular manner to achieve one or more particular control functions, either solely in hardware or in a combination of hardware, software and/or firmware.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc., or a non-portable computing device (NPCD) such as, for example, a PC, a desktop computer or a workstation computer.

FIG. 1 illustrates a block diagram of a Bluetooth subsystem (BTSS) RAM 100 currently used in wire-free music and voice delivery devices such as earbuds, hearables and headsets. FIG. 1 shows the partitioning of RAM 100 into different memory segments for storing different types of data. The boot instruction segment 101, sometimes referred to as the patch segment, is the portion of BTSS RAM 100 that stores the boot instructions. The heap segment 102 is the portion of BTSS RAM 100 that is dynamically allocated to different computer programs. The stack segment 103 is the portion of BTSS RAM 100 that is known to the compiler and is flushed after a method has completed its execution. The .bss segment 104 is a portion of the BTSS RAM 100 that contains statically-allocated variables that have been declared, but have not yet been assigned a value. The .data segment 105 is a portion of the BTSS RAM 100 that contains initialized static variables. The .txt segment 106 is a portion of the BTSS RAM 100 that contains compiled code of the computer program. The size of the heap and boot instruction segments 101 and 102, respectively, are fixed with definite starting addresses. After allocating the stack segment 103, the .bss segment 104, the .data segment 105 and the .txt segment 106, the remaining space in BTSS RAM 100 is allocated to the boot instruction segment 101 and the heap segment 102.

Currently, the Bluetooth boot process serializes downloading of the boot instruction segment 101 and performance of the radio frequency (RF) calibrations. The boot instruction segment 101 is downloaded first and then the RF calibration process is performed. The reason for serializing the performance of the download and the calibration processes is that it is possible that fixes and/or improvements will need to be made that alter the RF calibrations or some other process that runs before the RF calibrations. For this reason, the boot instruction segment 101 is downloaded prior to performing these other processes or the RF calibration process. There are analog components/circuitry in the RF analog (RFA) module of the BTSS whose behavior and performance varies among different silicon chips even though they are made by the same manufacturing process. These variations can result in changes needing to be made to results obtained during the boot process. For this reason, some RF calibration code is run during the boot process to characterize and calibrate these specific components for use later during the actual Bluetooth-connected session.

In accordance with inventive principles and concepts of the present disclosure, it has been determined that some of the RF calibration process and some of the boot process can be performed in parallel while other portions of those processes need to be performed serially. Based on this determination, the boot instruction segment 101 has been divided into at least a start-up boot instruction segment and a mission-mode boot instruction segment. The start-up boot instruction segment is downloaded prior to performance of the RF calibration process and the mission-mode boot instruction segment is downloaded in parallel with performance of the RF calibration process. Performing the downloading of the mission-mode boot instruction segment in parallel with performing RF calibration greatly reduces the total amount of time required to perform boot instruction download and RF calibration. For example, in some embodiments of the system and method of the present disclosure, performing the downloading of the mission-mode boot instruction segment in parallel with performing RF calibration reduced the total amount of time required to perform boot instruction download and execution and RF calibration by about 50%. As will be understood by those of skill in the art, the inventive principles and concepts are not limited in regard to the size of the time reduction achieved, as any time reduction is beneficial.

FIG. 2 illustrates a block diagram of a BTSS RAM 200 in accordance with a representative embodiment. The BTSS RAM 200 is identical to the BTSS RAM 100 shown in FIG. 1 except that the boot instruction segment 101 shown in FIG. 1 has been replaced in the BTSS RAM 200 with a start-up boot instruction segment 201a and a mission-mode boot instruction segment 201b. The start-up boot instruction segment 201a preferably only includes code that needs to be executed prior to performing RF calibration, such as start-up radio calibrations, effuse settings download, etc. The start-up boot instruction segment 201a can include, for example, boot instructions that fix bugs in the current boot instructions, boot instructions that fix bugs in the instructions associated with performing the RF calibration process, boot instructions that add a part to or remove a part of the RF calibration process, and boot instructions that modify one or more parameters used by the RF calibration process. The mission-mode boot instruction segment preferably includes code that can be executed exclusive of the RF calibration process, such as protocol changes, new Bluetooth specification features, etc. The mission-mode boot instruction segment 201b typically includes all of the boot instructions that are not part of the start-up boot instruction segment 201a.

The start-up boot instruction segment 201a can be downloaded and applied similar to the current approach described above with reference to FIG. 1. Preferably the start-up boot instruction segment 201a is much smaller than the mission-mode boot instruction segment 201b and does not need to be stored in persistent memory in compressed format. Therefore, decompression does not need to be performed when downloading the start-up boot instruction segment 201a to RAM 200. When the RF calibration process is being performed, the host processor has some downtime since it is not involved in the RF calibration process. The processor can take advantage of this downtime to expedite the process of downloading the mission-mode boot instruction segment 201b to RAM 200.

FIG. 3 illustrates a block diagram of the computer system 300 in accordance with a representative embodiment that includes the RAM 200 shown in FIG. 2 configured in the manner described above with reference to FIG. 2. A read only memory (ROM) 301 of the system 300 stores various types of software code that are typically programmed into the persistent memory 301 during manufacturing, including the start-up and mission-mode boot instructions 201a and 201b, respectively. RAM 200 contains data and computer instructions that can be read and changed in any order, including the heap segment 102, the stack segment 103, the .bss segment 104, the .data segment 105 and the .txt segment 106 shown in FIGS. 1 and 2.

At boot time, a host processor 310 of the system downloads the start-up boot instructions 201a and the mission-mode boot instructions 201b at different times from persistent memory 301 into RAM 200, as will be described below in more detail. The host processor 310 communicates with a packet processor 311, a modem 312 and with an RF analog (RFA) module 313 and sends control signals to each of them. The packet processor 311 receives data bits from the host processor 310 and converts them into packets for transmission via a Bluetooth protocol connection to devices external to the system 300. For example, if the system 300 is part of a wearable headset, the headset may be in communication with a smart phone via a Bluetooth connection for receiving music from the smart phone to be played on the speakers of the headset. The headset may also include a microphone to allow the user to use voice commands that are sent as Bluetooth packets to the smart phone.

In the transmission direction, the modem 312 converts packets received from the packet processor 311 into a complex baseband (IF) signal. The RFA module 313 generally comprises all of the analog circuitry in between the modem 312 and an RF antenna 314 of the computer system 300. The analog circuitry of the RFA module 313 converts the baseband signal received from the modem 312 into an RF Bluetooth signal for transmission via a Bluetooth protocol to some external receiving device (e.g., a smart phone).

In the receiving direction, the RFA module 313 converts an RF Bluetooth signal received via the RF antenna 314 into a baseband signal, which the modem 312 converts into packets that are forwarded to the packet processor 311. The packet processor 311 converts the packets into data bits that are then forwarded to the host processor 310 for processing. The data bits may be, for example, data bits of music being streamed from a smart phone to a headset via a Bluetooth connection, in which case the host processor 310 converts the data bits into an audio signal that can be heard through one or more speakers that are connected to the computer system 300.

In accordance with a preferred embodiment, the start-up boot instructions 201a are downloaded prior to components of the RFA module 313 being RF calibrated. After downloading and execution of the start-up boot instructions 201a, the RF calibration is performed during which components of the RFA module 313 are calibrated. The RF calibration process is a known process and therefore will not be described in detail herein in the interest of brevity. The mission-mode boot instructions 201*b* preferably are downloaded and executed in parallel with performance of the RF calibration process. The decision of which boot instructions are start-up boot instructions 201*a* and which boot instructions are mission-mode boot instructions 201*b* can vary depending on the type of device that incorporates the computer system 300 and depending on the components that comprise the RFA module 313. The boot instructions that are part of the start-up boot instructions 201*a* and the boot instructions that are part of the mission-mode boot instructions 201*b* can be determined at the time of manufacturing the system 300 and/or at the time of manufacturing the device in which the system 300 will be incorporated, but can also be determined after manufacturing if, for example, a determination is made during testing or during use that the boot instructions contain a bug or that the instructions associated with performing the RF calibration process contain a bug or need to be modified for some other reason (e.g., to improve performance).

FIG. 4 illustrates a flow diagram that represents the method for reducing boot time in a computer system in accordance with a representative embodiment. At boot time, a processor of the computer system downloads a start-up boot instruction segment from persistent memory of the computer system to RAM of the computer system and executes the start-up boot instruction segment, as indicated by block 401. After downloading and executing the start-up boot instruction segment, an RFA module of the computer system performs an RF calibration process that RF calibrates components of the RFA module, as indicated by block 402. During the RF calibration process, the processor downloads a mission-mode boot instruction segment from persistent memory to RAM and executes the mission-mode boot instruction segment, as indicated by block 403.

Although the wireless connection has been described above as being a Bluetooth connection, the wireless connection can be any suitable wireless connection, including a connection over a wireless local area network (WLAN), a connection over a wireless metropolitan network (WMAN), a connection over a wireless personal area network (WPAN), various types of Wi-Fi connections, and various types of Bluetooth connections, e.g., synchronous, connection-oriented (SCO) Bluetooth connections, asynchronous, connectionless (ACL) Bluetooth connections, etc.

The computer system 300 can be part of a wireless communication device, such as, for example, a wireless headset, a wireless earbud system, a wireless phone, a hearing assistance device, one or more wireless speakers, a wireless watch, etc. The inventive principles and concepts are not limited in regard to the types of devices or systems with which the computer system 300 can be used, as will be understood by those of skill in the art in view of the description provided herein. The external device that communicates wirelessly with the device that incorporates the computer system 300 can also be any type of wireless device, such as, for example, a wireless phone, a laptop computer, a desktop computer, a home entertainment system, a television, etc.

Figure 5:
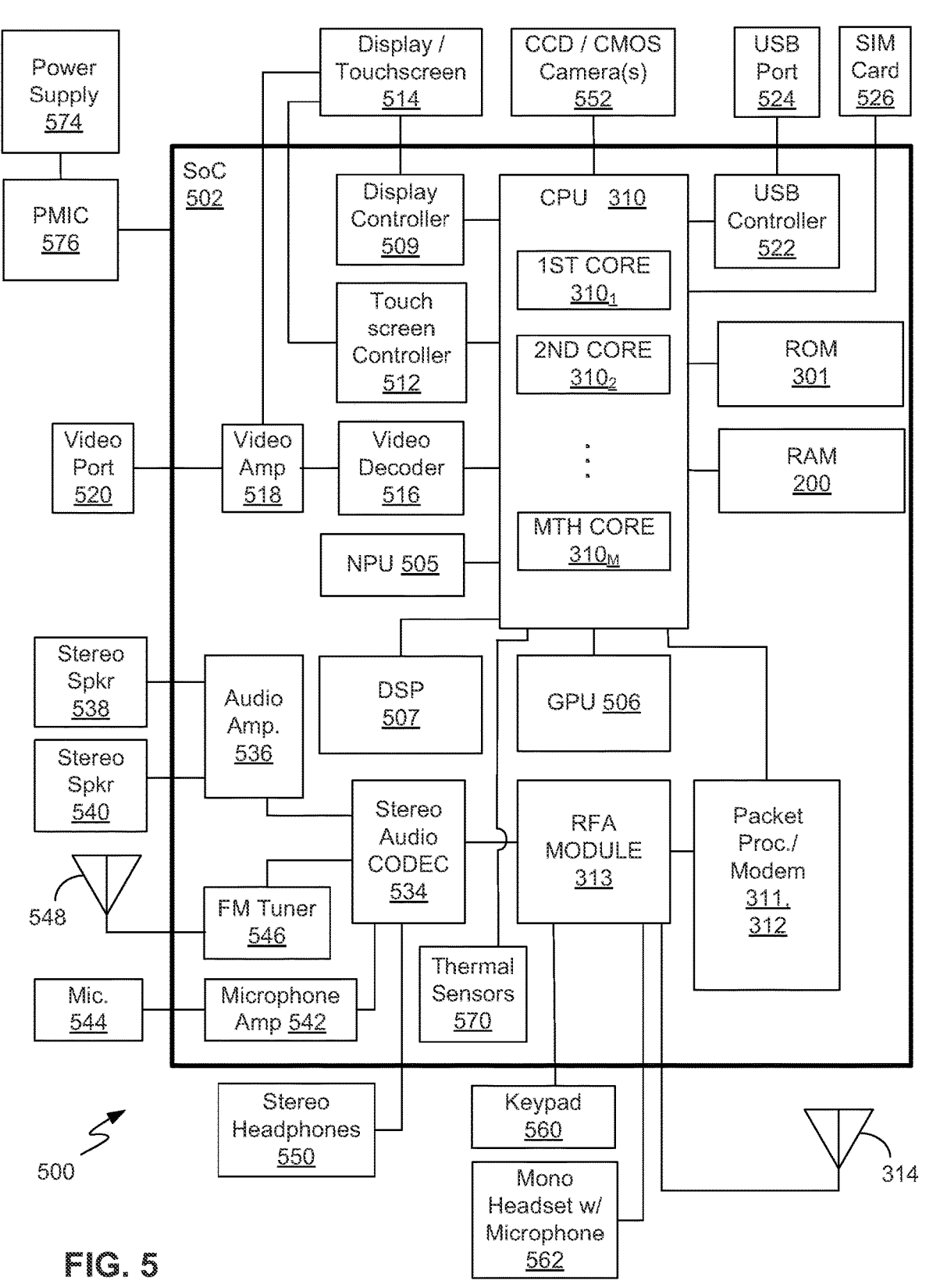
FIG. 5 illustrates an example of a PCD, such as a mobile phone, a smartphone, a headset system, an earbud system, a hearing assistance system, etc., in which exemplary embodiments of systems, methods, computer-readable media, and other examples of the inventive principles and concepts of the present disclosure may be implemented.

FIG. 5 illustrates an example of a PCD 500, such as a mobile phone, a smartphone, a headset system, an earbud system, a hearing assistance system, a wireless watch, etc., in which exemplary embodiments of systems, methods, computer-readable media, and other examples of the inventive principles and concepts of the present disclosure may be implemented. The PCD 500 comprises an SoC 502, which comprises the system 300 shown in FIG. 3 or a similar system for performing the methods described above with reference to FIGS. 2-4. For purposes of clarity, some interconnects, signals, etc., are not shown in FIG. 5.

The SoC 502 may include a CPU 310 that functions as the host processor 310 shown in FIG. 3, an NPU 505, a GPU 506, a DSP 507, an RFA module 313, a Packet Processor/Modem 311, 312, and/or other processors. Any processor of the SoC 502 can operate as the host processor 310 shown in FIG. 3, but for illustrative purposes the CPU 310 shown in FIG. 5 is assumed to be operating as the host processor 310 shown in FIG. 3. It should be noted that the host processor 310 need not be part of an SoC, but components 200, 301, 310, 311, 312 and 313 can be implemented in an SoC.

The CPU 310 may include one or more CPU cores, such as a first CPU core 310₁, a second CPU core 310₂, etc., through an M$^{th}$ CPU core 310$_M$. A display controller 509 and a touch-screen controller 512 may be coupled to the CPU 310. A touchscreen display 514 external to the SoC 502 may be coupled to the display controller 509 and the touch-screen controller 512. The PCD 500 may further include a video decoder 516 coupled to the CPU 310. A video amplifier 518 may be coupled to the video decoder 516 and the touch-screen display 514. A video port 520 may be coupled to the video amplifier 518. A universal serial bus ("USB") controller 522 may also be coupled to CPU 310, and a USB port 524 may be coupled to the USB controller 522. A subscriber identity module ("SIM") card 526 may also be coupled to the CPU 310.

One or more memories may be coupled to the CPU 310. The one or more memories may include both volatile and non-volatile memories, such as RAM 200 and persistent memory 301, respectively. Other examples of volatile memories include static random access memory ("SRAM"), dynamic random access memory ("DRAM"), double data rate synchronous DRAM (DDR SDRAM), etc. Such memories may be external to the SoC 502 or internal to the SoC 502. The one or more memories may also include local cache memory and/or a system-level cache memory.

A stereo audio CODEC 534 may be coupled to the RFA module 313. An audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 310 include one or more digital (e.g., CCD or CMOS) cameras 552.

The Packet Processor/Modem 311, 312 may be coupled to the RFA module 313 and the CPU 310. An RF antenna 314 may be coupled to the RFA module 313. A keypad 560 and a mono headset with a microphone 562 may be coupled to the RFA module 313. The SoC 502 may have one or more internal or on-chip thermal sensors 570. A power supply 574 and a power management IC (PMIC) 576 may supply power to the SoC 502.

Firmware or software may be stored in any of the above-described memories, or may be stored in a local memory directly accessible by the processor hardware on which the software or firmware executes. Execution of such firmware or software by logic of the CPU 310 may control aspects of any of the above-described methods or configure aspects of any of the above-described systems. Any such memory or other non-transitory storage medium having firmware and/or software stored therein in computer-readable form for execution by processor hardware may be an example of a "computer-readable medium," as the term is understood in the patent lexicon.

Implementation examples are described in the following numbered clauses:

1. A method for reducing boot time in a computer system, the method comprising:

with a processor of the computer system, downloading a start-up boot instruction segment from a persistent memory of the computer system to a random access memory (RAM) of the computer system and executing the start-up boot instruction segment;

with a radio frequency (RF) analog (RFA) module of the computer system configured to perform a wireless communication protocol, after downloading and executing the start-up boot instruction segment, performing an RF calibration process that RF calibrates components of the RFA module; and with the processor, during the RF calibration process, downloading a mission-mode boot instruction segment from the persistent memory to the RAM and executing the mission-mode boot instruction segment.

2. The method of clause 1, wherein the start-up boot instruction segment includes one or more computer instructions that, when executed by the host processor, make changes to computer instructions that control some or all of the RF calibration process.

3. The method of any of clauses 1-2, wherein the start-up boot instruction segment includes one or more computer instructions that, when executed by the host processor, make changes to computer instructions that control some or all of a process that is performed prior to the RF calibration process being performed.

4. The method of any of clauses 1-3, wherein the start-up boot instruction segment includes one or more computer instructions that, when executed by the host processor, modify one or more parameters of the RF calibration process.

5. The method of any of clauses 1-4, wherein the start-up boot instruction segment includes one or more computer instructions that, when executed by the host processor, perform an effuse settings download process that downloads effuse settings from the persistent memory to the RAM.

6. The method of any of clauses 1-5, wherein mission-mode boot instruction segment includes all boot instructions other than the boot instructions of the start-up boot instruction segment.

7. The method of any of clauses 1-6, wherein the computer system is part of a wireless communication device comprising a modem configured to perform the wireless communication protocol and an RF antenna, and wherein the computer system is in communication with an external device via a wireless connection created by the modem, the RFA module and the external device performing the wireless communication protocol.

8. The method of clause 7, wherein the external device comprises a wireless phone.

9. The method of any of clauses 7-8, wherein the wireless communication device comprises one of a wireless headset, a wireless earbud system, a wireless phone, one or more wireless speakers, a wireless watch, and a wireless hearing assistance device.

10. The method of any of clauses 1-9, wherein the computer system is part of system on chip (SoC) integrated circuit.

11. A computer system configured to reduce boot time, the computer system comprising:

a radio frequency (RF) analog (RFA) module of the computer system configured to perform an RF calibration process that RF calibrates the RFA module to perform a wireless communication protocol;

first processing logic configured to cause a start-up boot instruction segment to be downloaded from a persistent memory of the computer system to a random access memory (RAM) of the computer system and to be executed prior to the RFA module performing the RF calibration process; and second processing logic configured to cause a mission-mode boot instruction segment to be downloaded from the persistent memory to the RAM and executed during the RF calibration process.

12. The computer system of clause 11, wherein the start-up boot instruction segment includes one or more computer instructions that, when executed by the first processing logic, make changes to computer instructions that control some or all of the RF calibration process.

13. The computer system of any of clauses 11-12, wherein the start-up boot instruction segment includes one or more computer instructions that, when executed by the first processing logic, make changes to computer instructions that control some or all of a process that is performed prior to the RF calibration process being performed.

14. The computer system of any of clauses 11-13, wherein the start-up boot instruction segment includes one or more computer instructions that, when executed by the first processing logic, modify one or more parameters of the RF calibration process.

15. The computer system of any of clauses 11-14, wherein the start-up boot instruction segment includes one or more computer instructions that, when executed by the first processing logic, perform an effuse settings download process that downloads effuse settings from the persistent memory to the RAM.

16. The computer system of any of clauses 11-15, wherein mission-mode boot instruction segment includes all boot instructions other than the boot instructions of the start-up boot instruction segment.

17. The computer system of any of clauses 11-16, wherein the computer system is part of a wireless communication device comprising a modem configured to perform the wireless communication protocol and an RF antenna, and wherein the computer system is in communication with an external device via a wireless connection created by the modem, the RFA module and the external device performing the wireless communication protocol.

18. The computer system of clause 17, wherein the external device comprises a wireless phone.

19. The computer system of any of clauses 17-18, wherein the wireless communication device comprises one of a wireless headset, a wireless earbud system, a wireless phone, one or more wireless speakers, a wireless watch, and a wireless hearing assistance device.

20. The computer system of any of clauses 11-19, wherein the computer system is part of system on chip (SoC) integrated circuit.

21. A program comprising computer instructions for execution by a host processor of a computer system for reducing boot time of the computer system, the computer program being embodied on a non-transitory computer-readable medium, the computer instructions comprising:

a start-up boot instruction segment stored in a random access memory (RAM) for execution by the host processor prior to a radio frequency (RF) analog (RFA) module of the computer system performing an RF calibration process that RF calibrates the RFA module to perform a wireless communication protocol; and a mission-mode boot instruction segment stored in the RAM for execution by the host processor during the RF calibration process.

22. The computer program of clause 21, wherein the start-up boot instruction segment includes boot instructions that need to be executed by the host processor prior to the RF calibration process being performed to ensure that the RF calibration process is performed correctly.

23. The computer program of any of clauses 21-22, wherein the start-up boot instruction segment includes one or more computer instructions that, when executed by the host processor, make changes to computer instructions that control some or all of the RF calibration process.

24. The computer program of any of clauses 21-23, wherein the start-up boot instruction segment includes one or more computer instructions that, when executed by the host processor, make changes to computer instructions that control some or all of a process that is performed prior to the RF calibration process being performed.

25. The computer program of any of clauses 21-24, wherein the start-up boot instruction segment includes one or more computer instructions that, when executed by the host processor, perform an effuse settings download process that downloads effuse settings from the persistent memory to the RAM.

26. The computer program of any of clauses 21-25, wherein the start-up boot instruction segment includes one or more computer instructions that, when executed by the host processor, modify one or more parameters of the RF calibration process.

27. The computer program of any of clauses 21-26, wherein mission-mode boot instruction segment includes all boot instructions other than the boot instructions of the start-up boot instruction segment.

28. The computer program of any of clauses 21-27, wherein the computer system is part of a wireless communication device comprising a modem configured to perform the wireless communication protocol and an RF antenna, and wherein the computer system is in communication with an external device via a wireless connection created by the modem, the RFA module and the external device performing the wireless communication protocol.

29. The computer program of clause 28, wherein the wireless communication device comprises one of a wireless headset, a wireless earbud system, a wireless phone, one or more wireless speakers, a wireless watch, and a wireless hearing assistance device.

30. A computer system having a reduced boot time comprising:

means for downloading a start-up boot instruction segment from a persistent memory to a random access memory (RAM) and for executing the start-up boot instruction segment prior to a radio frequency (RF) calibration process being performed that calibrates an RF analog (RFA) module of the computer system to perform a wireless communication protocol; and means for downloading a mission-mode boot instruction segment from the persistent memory to the RAM and for executing the mission-mode boot instruction segment during the RF calibration process.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for reducing boot time in a computer system and reducing time for the computer system to couple with an external device over a wireless communication protocol, the method comprising:

with a host processor of the computer system, downloading a start-up boot instruction segment from a persistent memory of the computer system to a random access memory (RAM) of the computer system and executing the start-up boot instruction segment; the start-up boot instruction segment containing computer instructions that control some or all of a radio frequency (RF) calibration process; the external device relative to the computer system supporting a wireless communication protocol; the wireless communication protocol comprising a Bluetooth protocol; the computer system comprising an RF antenna, a radio frequency analog (RFA) module, a modem, and a packet processor; the RF antenna communicating with the external device;

with the RFA module of the computer system configured to perform the wireless communication protocol, after downloading and executing the start-up boot instruction segment, performing the RF calibration process that RF calibrates components of the RFA module; and with the host processor, during the RF calibration process, downloading a mission-mode boot instruction segment from the persistent memory to the RAM and executing the mission-mode boot instruction segment, the RFA module being coupled to the antenna; the packet processor being coupled to the host processor, the modem demodulating signals received from the RFA module and sending those signals to the packet processor, and the modem modulating signals received from the packet processor and sending those signals to the RFA module, the packet processor creating data packets for the modem from signals received from the host processor and converting packets received from the modem into data bits for the host processor.

2. The method of claim 1, wherein the start-up boot instruction segment includes one or more computer instructions that, when executed by the host processor, make changes to computer instructions that control some or all of a process that is performed prior to the RF calibration process being performed.

3. The method of claim 1, wherein the start-up boot instruction segment includes one or more computer instructions that, when executed by the host processor, modify one or more parameters of the RF calibration process.

4. The method of claim 1, wherein the start-up boot instruction segment includes one or more computer instructions that, when executed by the host processor, perform an effuse settings download process that downloads effuse settings from the persistent memory to the RAM.

5. The method of claim 1, wherein mission-mode boot instruction segment includes all boot instructions other than the boot instructions of the start-up boot instruction segment.

6. The method of claim 1, wherein the external device comprises one of a wireless headset, a wireless earbud system, a wireless phone, one or more wireless speakers, a wireless watch, and a wireless hearing assistance device.

7. The method of claim 1, wherein the computer system is part of system on chip (SoC) integrated circuit.

8. A computer system configured to reduce boot time and time for coupling with an external device over a wireless communication protocol, the computer system comprising:
  a radio frequency (RF) antenna for communicating with the external device;
  a radio frequency analog (RFA) module of the computer system coupled to the antenna and configured to perform an RF calibration process that RF calibrates the RFA module to perform the wireless communication protocol, the wireless communication protocol comprising a Bluetooth protocol;
  the RFA module coupled to a modem;
  the modem coupled to a packet processor;
  the packet processor coupled to a host processor, the modem demodulating signals received from the RFA module and sending those signals to the packet processor, and the modem modulating signals received from the packet processor and sending those signals to the RFA module, the packet processor creating data packets for the modem from signals received from the host processor and converting packets received from the modem into data bits for the host processor;
  first processing logic of the host processor configured to cause a start-up boot instruction segment to be downloaded from a persistent memory of the computer system to a random access memory (RAM) of the computer system and to be executed prior to the RFA module performing the RF calibration process; the start-up boot instruction segment includes one or more computer instructions that control some or all of the RF calibration process; and
  second processing logic of the host processor configured to cause a mission-mode boot instruction segment to be downloaded from the persistent memory to the RAM and executed during the RF calibration process.

9. The computer system of claim 8, wherein the start-up boot instruction segment includes one or more computer instructions that, when executed by the first processing logic, make changes to computer instructions that control some or all of a process that is performed prior to the RF calibration process being performed.

10. The computer system of claim 8, wherein the start-up boot instruction segment includes one or more computer instructions that, when executed by the first processing logic, modify one or more parameters of the RF calibration process.

11. The computer system of claim 8, wherein the start-up boot instruction segment includes one or more computer instructions that, when executed by the first processing logic, perform an effuse settings download process that downloads effuse settings from the persistent memory to the RAM.

12. The computer system of claim 8, wherein mission-mode boot instruction segment includes all boot instructions other than the boot instructions of the start-up boot instruction segment.

13. The computer system of claim 8, wherein the external device comprises one of a wireless headset, a wireless earbud system, a wireless phone, one or more wireless speakers, a wireless watch, and a wireless hearing assistance device.

14. The computer system of claim 8, wherein the computer system is part of system on chip (SoC) integrated circuit.

* * * * *